United States Patent
Oka et al.

(10) Patent No.: US 7,199,820 B2
(45) Date of Patent: Apr. 3, 2007

(54) SYNCHRONIZING IMAGE PICKUP PROCESS OF A PLURALITY OF IMAGE PICKUP APPARATUSES

(75) Inventors: Hiroto Oka, Kanagawa (JP); Shinichi Hatae, Kanagawa (JP); Shinichi Koyama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 503 days.

(21) Appl. No.: 10/073,460

(22) Filed: Feb. 11, 2002

(65) Prior Publication Data

US 2002/0135682 A1 Sep. 26, 2002

(30) Foreign Application Priority Data

Feb. 13, 2001 (JP) ............................ 2001-035847

(51) Int. Cl.
*H04N 5/232* (2006.01)
*H04N 7/14* (2006.01)
*H04N 5/76* (2006.01)

(52) U.S. Cl. ............................... 348/211.3; 348/14.09; 348/231.5

(58) Field of Classification Search ................ 348/47, 348/48, 143, 153, 157, 159, 211.3, 333.01, 348/333.11, 333.12
See application file for complete search history.

(56) References Cited

U.S. PATENT DOCUMENTS 5,552,824 A * 9/1996 DeAngelis et al. ......... 348/157
5,768,151 A * 6/1998 Lowy et al. ................ 348/157
5,982,418 A * 11/1999 Ely ............................ 348/153
5,995,140 A * 11/1999 Cooper et al. .............. 348/159
6,084,979 A * 7/2000 Kanade et al. ............... 348/48
6,286,071 B1 * 9/2001 Iijima ......................... 710/124
6,791,602 B1 * 9/2004 Sasaki et al. ............... 348/159

FOREIGN PATENT DOCUMENTS

| JP | 55-161469 | 12/1980 |
|---|---|---|
| JP | 01-212977 | 8/1989 |
| JP | 08-016943 | 1/1996 |
| WO | WO 00/72597 | 11/2000 |

* cited by examiner

*Primary Examiner*—David Ometz
*Assistant Examiner*—Luong T. Nguyen
(74) *Attorney, Agent, or Firm*—Cowan, Liebowitz & Latman, P.C.

(57) ABSTRACT

Image pickup processes of a plurality of image pickup apparatuses are synchronized by using one kind of communication medium (for example, IEEE 1394-1995 standard or its extended standard). A control device selects a master camera from the plurality of image pickup apparatuses. The master camera generates a time stamp for synchronizing frame synchronization signals of all of the image pickup apparatuses (including the master camera). All of the image pickup apparatuses (including the master camera) generate the frame synchronization signals on the basis of the time stamp generated by the master camera and generate image data on the basis of the generated frame synchronization signals.

10 Claims, 5 Drawing Sheets

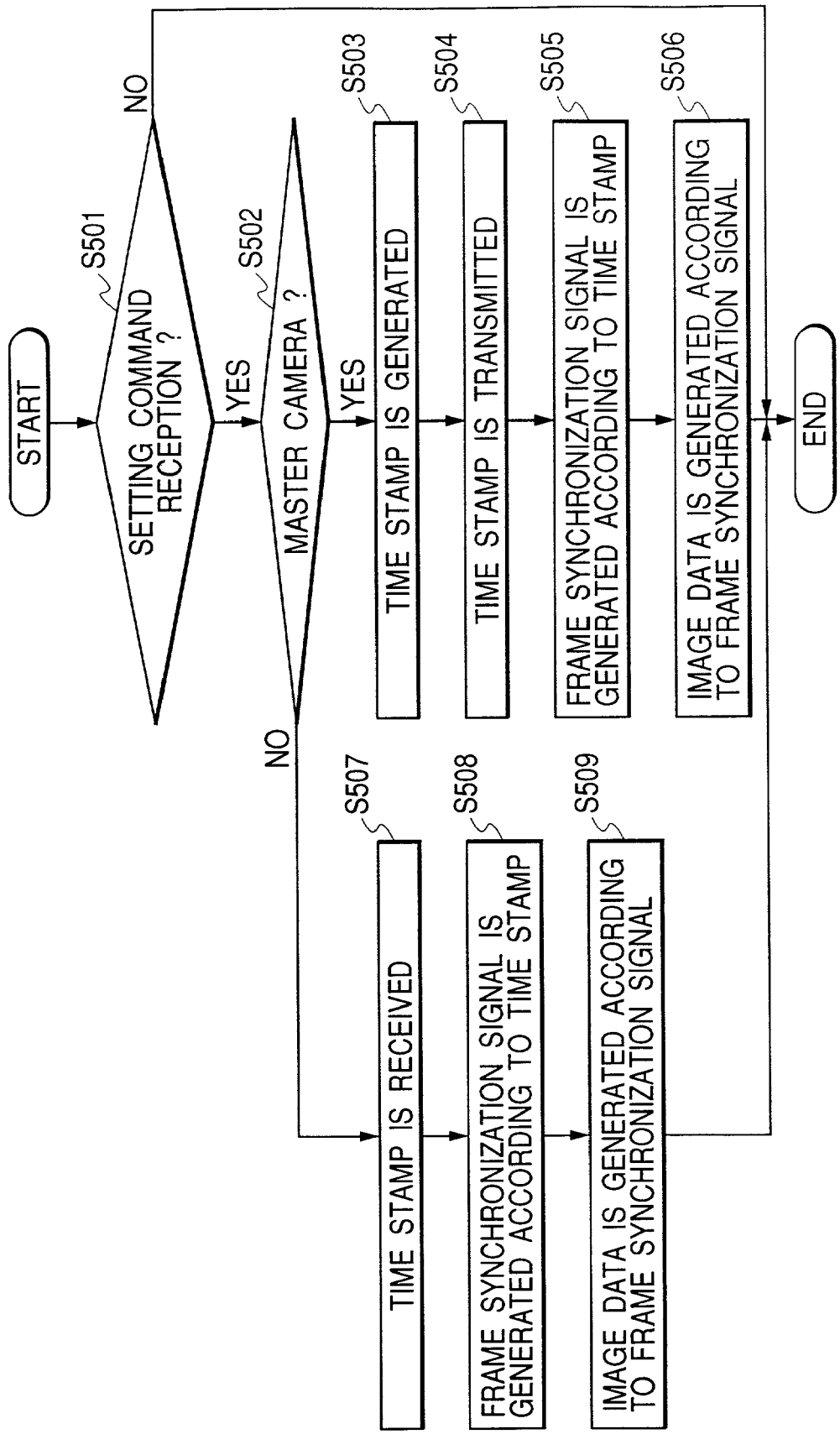

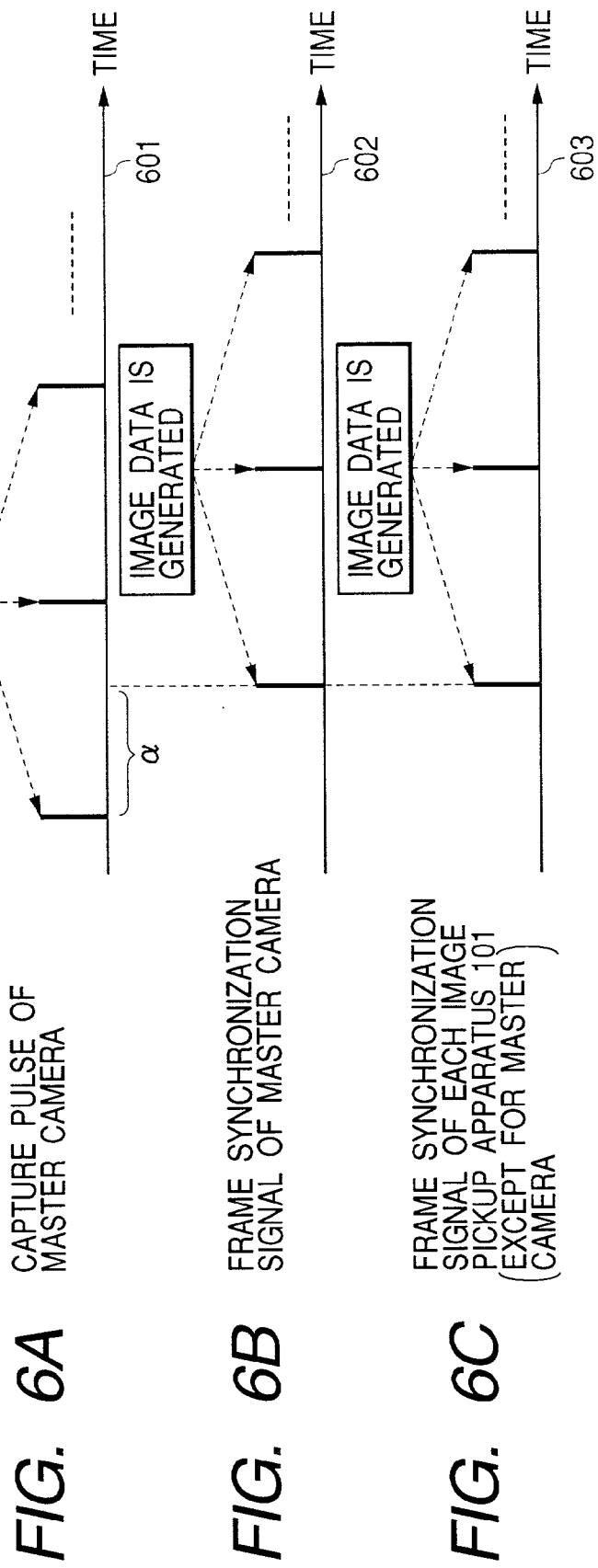

SYNCHRONIZING IMAGE PICKUP PROCESS OF A PLURALITY OF IMAGE PICKUP APPARATUSES

BACKGROUND OF THE INVENTION

1. Field of the Invention

The invention relates to an image pickup system for controlling a plurality of image pickup apparatuses.

2. Related Background Art

As image pickup systems using a plurality of image pickup apparatuses, for example, there are a system for displaying images photographed by the image pickup apparatuses by a multiscreen, a system for forming a 3-dimensional image of an object to be photographed, a system for measuring a distance to the object, and a system for forming a wide area image such as a panoramic image or the like. In such image pickup systems, it is necessary to synchronize image pickup processes of a plurality of image pickup apparatuses.

However, the conventional image pickup system has a problem such that since a communication medium to transmit synchronization information for synchronizing the image pickup processes of a plurality of image pickup apparatuses is necessary in addition to a communication medium to transmit image data, wirings are troublesome and a system construction becomes complicated.

SUMMARY OF THE INVENTION

The invention is made to solve the above problem and it is an object of the invention to synchronize image pickup processes of a plurality of image pickup apparatuses by using one kind of communication medium.

According to a preferred embodiment of the invention, there is provided an image pickup system including a plurality of image pickup apparatuses connected to a predetermined communication medium, wherein one of the plurality of image pickup apparatuses comprises synchronization information generating means for generating synchronization information for synchronizing the plurality of image pickup apparatuses and transmitting means for transmitting the synchronization information to the plurality of image pickup apparatuses, and each of the plurality of image pickup apparatuses comprises receiving means for receiving the synchronization information, frame synchronization signal generating means for generating a frame synchronization signal on the basis of the synchronization information, and image data generating means for generating image data on the basis of the frame synchronization signal.

Still other objects of the present invention, and the advantages thereof, will become fully apparent from the following detailed description of the embodiments.

BRIEF DESCRIPTION OF THE DRAWINGS

FIG. 5 is a flowchart for explaining a processing procedure of the image pickup apparatus according to the embodiment; and FIGS. 6A, 6B and 6C are diagrams showing timings of frame synchronization signals which are generated by the image pickup apparatuses (including a master camera) according to the embodiment.

DETAILED DESCRIPTION OF THE PREFERRED EMBODIMENTS

A preferred embodiment of the invention will be described hereinbelow with reference to the drawings.

Figure 1:
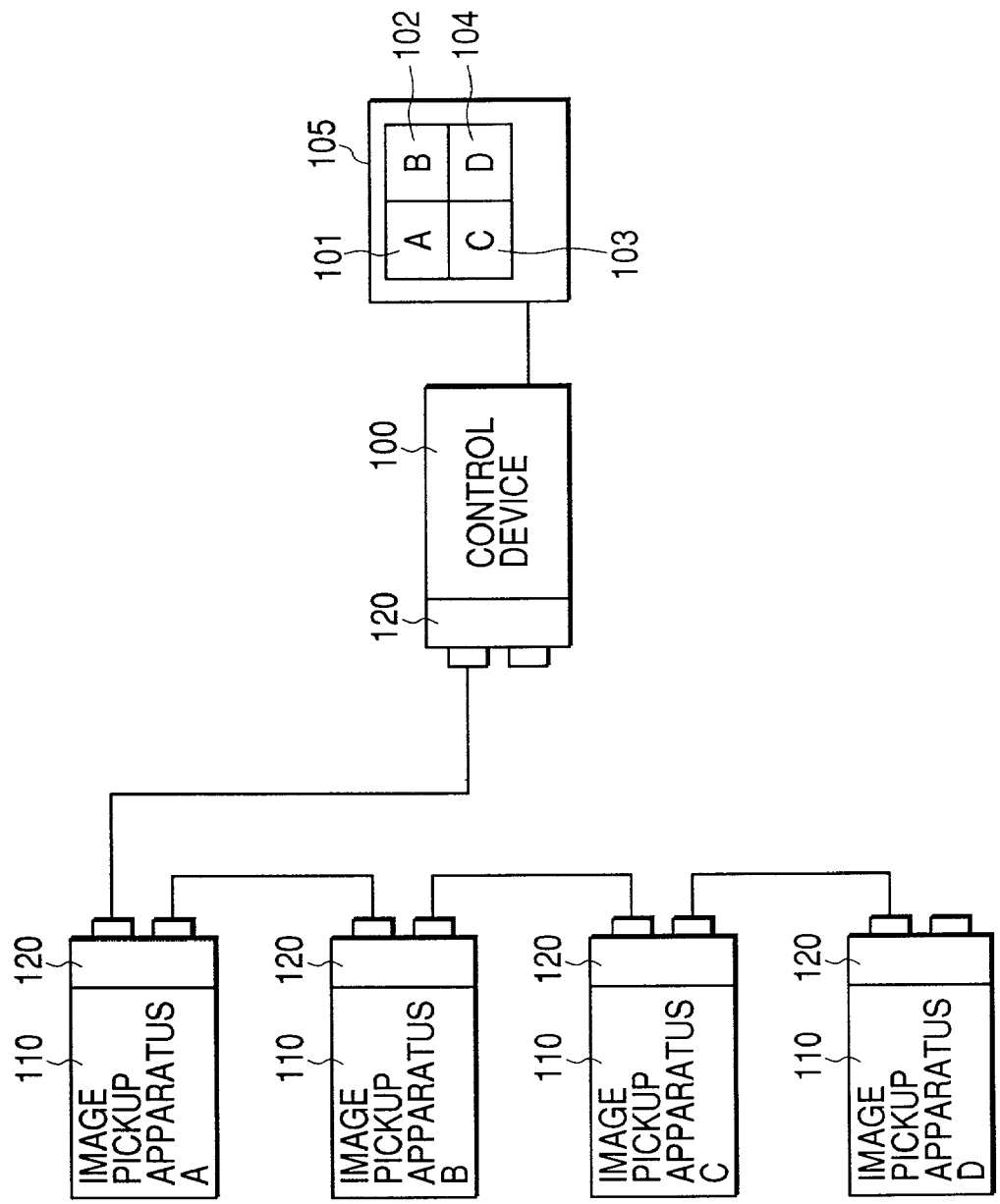
FIG. 1 is a diagram showing an example of an image pickup system according to an embodiment.

FIG. 1 is a diagram showing an example of an image pickup system according to the embodiment. In the embodiment, an image pickup system using a high speed serial bus which conforms with, for example, the IEEE1394-1995 standard or its extended standard (for example, IEEE1394a-2000 standard) will be explained.

In FIG. 1, reference numeral 100 denotes a control device; 110 an image pickup apparatus; and 120 a digital interface (hereinafter, referred to as an IEEE1394 interface) which conforms with the IEEE1394-1995 standard as one of the standards regarding the serial bus or its extended standard. The control device 100 is constructed by, for example, a computer, a television receiver, and the like. Each image pickup apparatus 110 is constructed by, for example, a digital video camera, a camera integrated type digital video recorder, a monitoring camera, or the like. Reference numerals 101 to 104 denote display areas which a display device 105 connected to the control device 100 has. The area 101 displays image data of an image photographed by the image pickup apparatus A. The area 102 displays image data of an image photographed by the image pickup apparatus B. The area 103 displays image data of an image photographed by the image pickup apparatus C. The area 104 displays image data of an image photographed by the image pickup apparatus D.

The control device 100 sets one image pickup apparatus 110 to "master camera" in accordance with a procedure, which will be explained hereinlater. The master camera generates synchronization information (hereinbelow, referred to as a time stamp) for synchronizing frame synchronization signals of all of the image pickup apparatuses 110 (including the master camera) in accordance with a procedure, which will be explained hereinlater. All of the image pickup apparatuses 110 (including the master camera) generates the frame synchronization signals in response to the time stamp generated by the master camera in accordance with a procedure, which will be explained hereinlater.

The IEEE1394 interface 120 automatically recognizes a topology of the system again each time a bus reset specified by the IEEE1394-1995 standard or its extended standard occurs. At this time, a node ID is automatically set into each IEEE1394 interface 120. The node ID is a communication address specified by the IEEE1394-1995 standard or its extended standard. According to the IEEE1394-1995 standard or its extended standard, a data packet is transmitted and received by using the node ID.

The IEEE1394 interface 120 also has an Isochronous transfer system and an Asynchronous transfer system. The Isochronous transfer system is suitable for transmission of motion image data or audio data because a predetermined bandwidth can be assured every predetermined communication cycle (almost 125 μsec). The Asynchronous transfer system is suitable for transmission of control information or a still image because it has a procedure which guarantees transmission of data packet.

Figure 2:
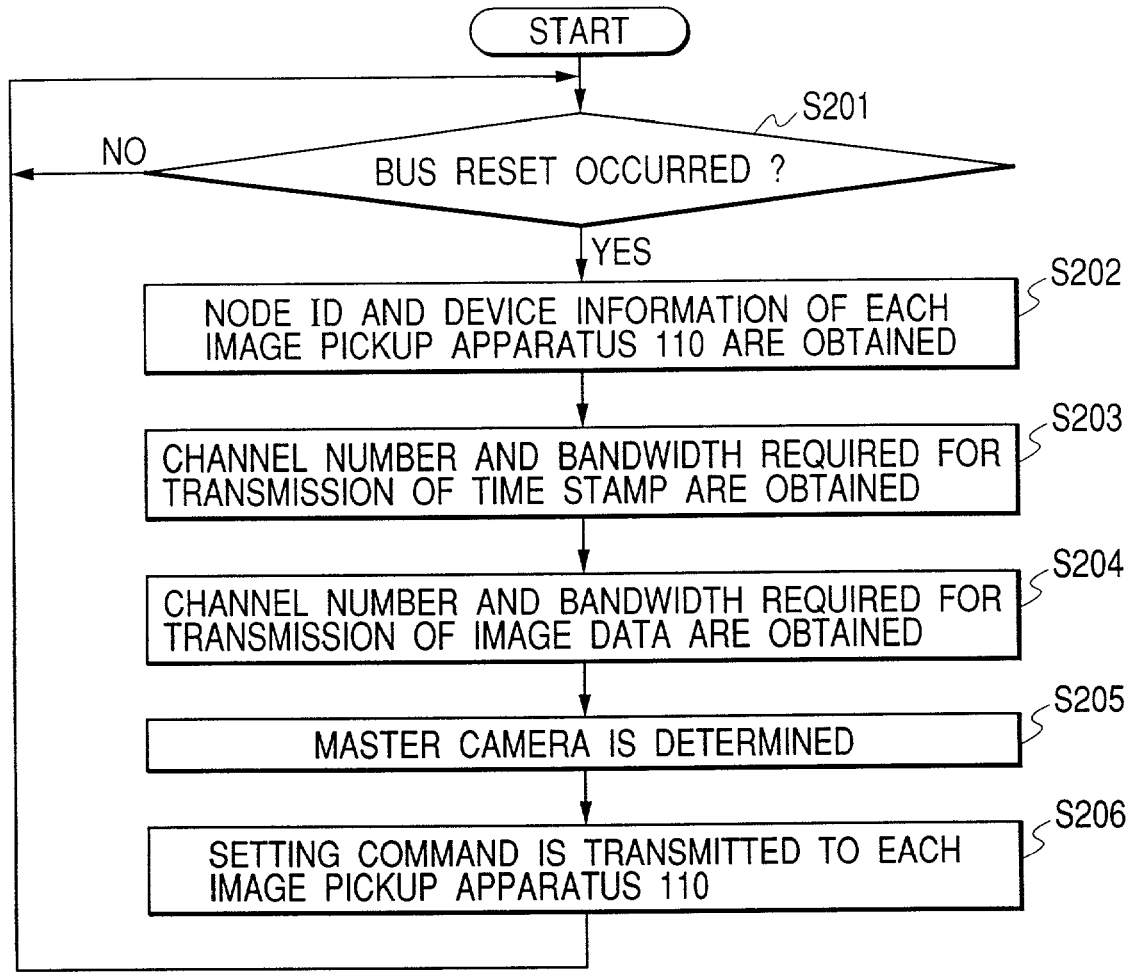
FIG. 2 is a flowchart for explaining a processing procedure for a control device according to the embodiment.

A processing procedure for the control device 100 according to the embodiment will now be described with reference to FIG. 2. In FIG. 2, a procedure which is executed until the image pickup apparatus 110 serving as a master camera is selected and a setting command is transmitted to each image pickup apparatus 110 will be explained.

Step S201: The control device 100 discriminates whether the bus reset specified by the IEEE1394-1995 standard or its extended standard has occurred or not. If the bus reset has occurred, step S202 follows.

Step S202: The control device 100 obtains the node ID and device information of each image pickup apparatus 110. The device information includes data showing a bandwidth required for transmission of the image data. The control device 100 holds the node ID and device information of the image pickup apparatuses 110 into an internal memory.

Step S203: The control device 100 assures isochronous resources (channel number and bandwidth) required for transmission and reception of the time stamp. The isochronous resources are managed by an isochronous resource manager specified by the IEEE1394-1995 standard.

Step S204: The control device 100 assures isochronous resources (channel number and bandwidth) required for transmission of the image data every image pickup apparatus 110. The control device 100 holds the isochronous resources (channel number and bandwidth) obtained every image pickup apparatus 110 into an internal memory.

Step S205: The control device 100 selects one of the plurality of image pickup apparatuses 110 and sets the selected image pickup apparatus 110 to the master camera. As a method of selecting the image pickup apparatus 110 serving as a master camera, for example, one of the following four methods is used. The first method is a method whereby the image pickup apparatus 110 having the largest node ID is automatically set to the master camera. The second method is a method whereby the image pickup apparatus 110 having the smallest node ID is automatically set to the master camera. The third method is a method whereby the image pickup apparatus 110 having the node ID selected at random is set to the master camera. The fourth method is a method whereby the image pickup apparatus 110 selected by the user is set to the master camera.

Figure 3:
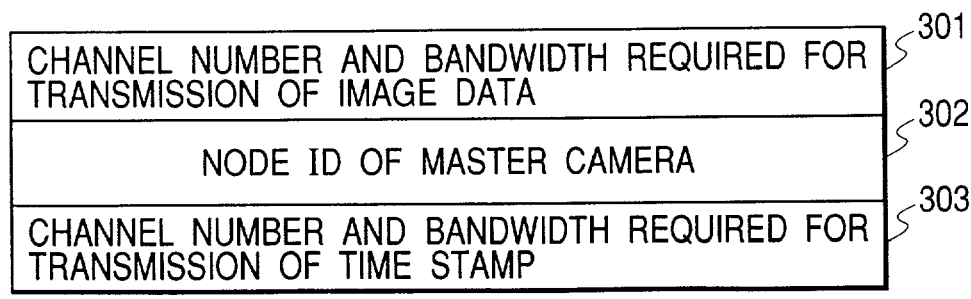
FIG. 3 is a diagram for explaining a setting command according to the embodiment.

Step S206: The control device 100 transmits the setting command to each image pickup apparatus 110. FIG. 3 shows main data included in the setting command. Data 301 shows the isochronous resources (channel number and bandwidth) required for transmission of the image data. The data 301 differs every image pickup apparatus 110. Data 302 indicates the node ID of the image pickup apparatus 110 serving as a master camera. Data 303 shows the isochronous resources (channel number and bandwidth) required for transmission and reception of the time stamp.

A main construction of the image pickup apparatus 110 according to the embodiment will now be described with reference to FIG. 4.

Figure 4:
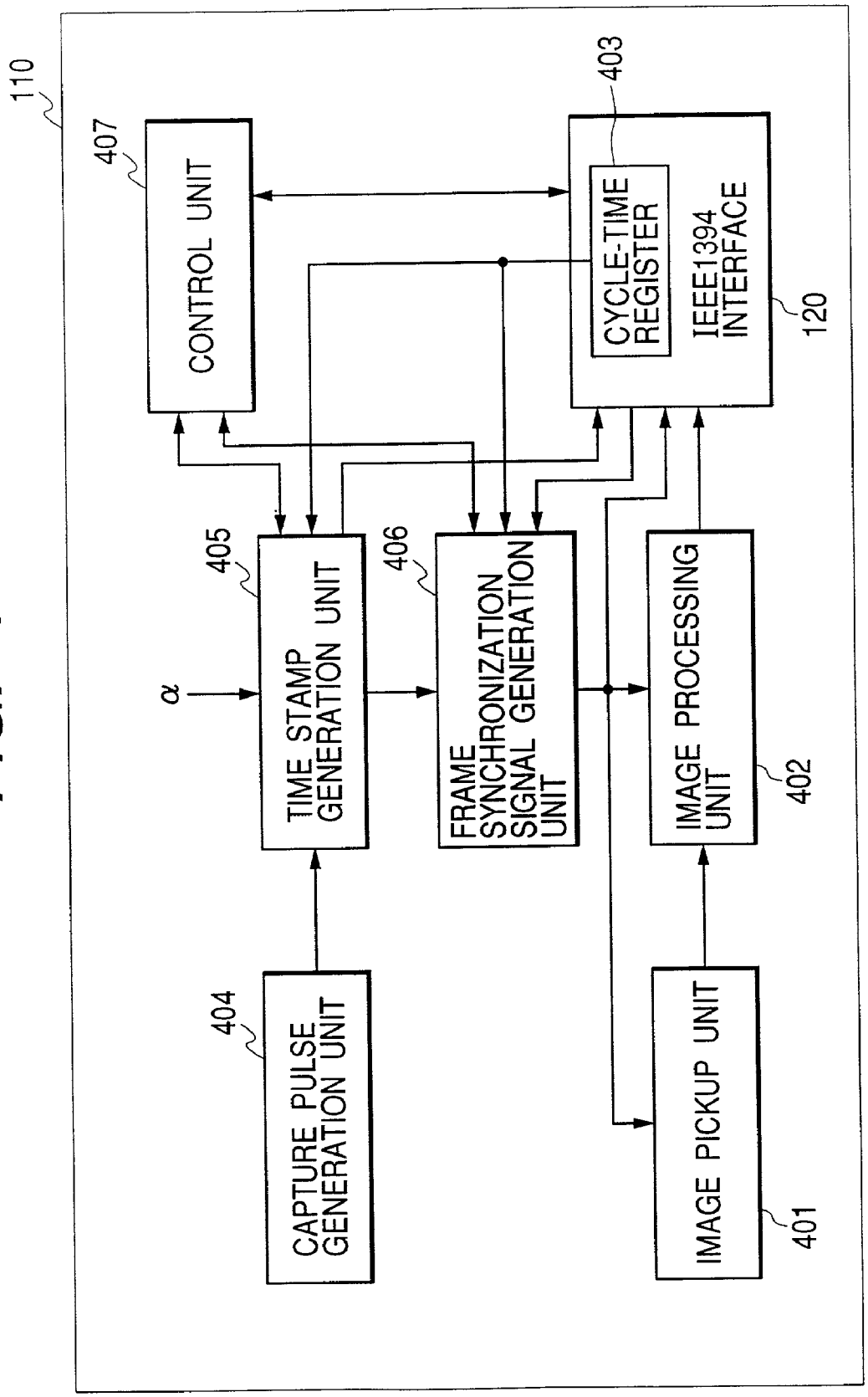
FIG. 4 is a diagram showing a main construction of an image pickup apparatus according to the embodiment.

In FIG. 4, reference numeral 401 denotes an image pickup unit; 402 an image processing unit; 403 a cycle-time register; 404 a capture pulse generation unit; 405 a time stamp generation unit; 406 a frame synchronization signal generation unit; and 407 a control unit.

The image pickup unit 401 photographs an optical image of an object to be photographed in response to the frame synchronization signal generated by the frame synchronization signal generation unit 406 and generates image data corresponding to the optical image of the object. The image processing unit 402 converts the image data generated by the image pickup unit 401 into image data of a predetermined data format. The IEEE1394 interface 120 transmits the image data generated by the image processing unit 402 to the control device 100 by using the Isochronous transfer system specified by the IEEE1394-1995 standard. The Isochronous transfer system is suitable for transmission of motion image data, audio data, or the like because a predetermined bandwidth can be assured every 125 μsec.

The cycle-time register 403 exists in a CSR (Control and Status Registers) architecture which the IEEE1394 interface 120 has. The cycle-time register 403 stores time information (cycle time) for managing the communication cycle (almost 125 μsec) specified by the IEEE1394-1995 standard or its extended standard. The cycle time stored in the cycle-time register 403 is updated by a cycle start packet in which a cycle master specified by the IEEE1394-1995 standard or its extended standard is broadcasted every 125 μsec. After it is updated, the cycle time stored in the cycle-time register 403 is counted by clocks of 24.576 MHz.

The time stamp generation unit 405 is made operative when the image pickup apparatus 110 is set to the master camera. The time stamp generation unit 405 obtains the cycle time held in the cycle-time register 403 in response to the capture pulse generated by the capture pulse generation unit 404. Subsequently, the time stamp generation unit 405 adds a predetermined value a to the obtained cycle time, thereby generating the time stamp. The predetermined value α is a value obtained by sufficiently taking into consideration a delay time that is caused by the transmission or the like of the time stamp. The time stamp generated by the time stamp generation unit 405 is supplied to the frame synchronization signal generation unit 406 and IEEE1394 interface 120. The IEEE1394 interface 120 transmits the time stamp to each image pickup apparatus 110 (except for the master camera) by using the Isochronous transfer system.

The frame synchronization signal generation unit 406 executes different processes depending on whether the image pickup apparatus is the master camera or not. In case of the master camera, the frame synchronization signal generation unit 406 compares the time stamp generated by the time stamp generation unit 405 with the cycle time read out from the cycle-time register 403 and generates the frame synchronization signal when they coincide. In case of the image pickup apparatus other than the master camera, the frame synchronization signal generation unit 406 compares the time stamp received by the IEEE1394 interface 120 with the cycle time read out from the cycle-time register 403 and generates the frame synchronization signal when they coincide. Since timing for generating the frame synchronization signal is controlled by the time stamp, it is generated at the timing that is delayed from a capture pulse by the time corresponding to the predetermined value α. The frame synchronization signal generated by the frame synchronization signal generation unit 406 is supplied to the image pickup unit 401, image processing unit 402, and IEEE1394 interface 120. Thus, the image pickup process of each image pickup apparatus 110 (except for the master camera) is synchronized with the image pickup process of the master camera.

Subsequently, a processing procedure of each image pickup apparatus 110 according to the embodiment will be described with reference to FIGS. 5 and 6A to 6C. FIG. 5 is a flowchart for explaining the processing procedure of each image pickup apparatus 110 according to the embodiment.

FIG. 6A is a diagram showing timing for the capture pulse which is generated by the master camera. FIG. 6B is a diagram showing timing for the frame synchronization signal which is generated by the master camera. FIG. 6C is a diagram showing timing for the frame synchronization signal which is generated by each image pickup apparatus 110 (except for the master camera).

Step S501: The control unit 407 discriminates whether the IEEE1394 interface 120 has received the setting command transmitted from the control device 100 or not. If the setting command is received, step S502 follows. If NO, the present processing routine is finished.

Step S502: The control unit 407 compares the data 302 (node ID of the master camera) of the setting command with its own node ID. When they coincide, the image pickup apparatus is set to the master camera. In case of the master camera, step S503 follows. In case of the image pickup apparatus other than the master camera, step S507 follows.

Step S503: The time stamp generation unit 405 of the master camera generates the time stamp in accordance with a capture pulse 601 generated by the capture pulse generation unit 404. The time stamp generated by the time stamp generation unit 405 is supplied to the frame synchronization signal generation unit 406 and IEEE1394 interface 120.

Step S504: The IEEE1394 interface 120 of the master camera transmits the time stamp generated by the time stamp generation unit 405 to each image pickup apparatus 110 (except for the master camera) by using the Isochronous transfer system. The IEEE1394 interface 120 isochronously transfers the time stamp by using the data 303 (including the channel number and bandwidth required for transmission and reception of the time stamp) of the setting command.

Step S505: The frame synchronization signal generation unit 406 of the master camera compares the time stamp generated by the time stamp generation unit 405 with the cycle time read out from the cycle-time register 403 and generates a frame synchronization signal 602 when they coincide. As shown in FIGS. 6A to 6C, the frame synchronization signal 602 is generated at the timing that is delayed from the capture pulse 601 by the time corresponding to the predetermined value a. The frame synchronization signal generated by the frame synchronization signal generation unit 406 is supplied to the image pickup unit 401, image processing unit 402, and IEEE1394 interface 120.

Step S506: The image pickup unit 401 of the master camera photographs the optical image of the object to be photographed in response to the frame synchronization signal 602 and generates the image data corresponding to the optical image of the object. The image processing unit 402 converts the image data generated by the image pickup unit 401 into the image data of a predetermined data format. The IEEE1394 interface 120 transmits the image data generated by the image processing unit 402 to the control device 100 by using the Isochronous transfer system specified by the IEEE1394-1995 standard. The IEEE1394 interface 120 isochronously transfers the image data by using the data 301 (including the channel number and bandwidth required for transmission of the image data) of the setting command. The control device 100 receives the image data isochronously transferred from the master camera and displays the image data onto the display device 105.

Step S507: The IEEE1394 interface 120 of each image pickup apparatus 110 (except for the master camera) receives the time stamp transmitted from the master camera. The IEEE1394 interface 120 receives the time stamp isochronously transferred from the master camera by using the data 303 (including the channel number and bandwidth required for transmission and reception of the time stamp).

Step S508: A frame synchronization signal generation unit 406 of each image pickup apparatus 110 (except for the master camera) compares the time stamp received by the IEEE1394 interface 120 with the cycle time read out from the cycle-time register 403 and generates a frame synchronization signal 603 when they coincide. As shown in FIGS. 6A to 6C, the frame synchronization signal 603 is generated at the timing that is delayed from the capture pulse 601 by the time corresponding to the predetermined value α. By constructing the system as mentioned above, each image pickup apparatus 110 (except for the master camera) can generate the frame synchronization signal 603 at the same timing as that of the frame synchronization signal 602 of the master camera. The frame synchronization signal generated by the frame synchronization signal generation unit 406 is supplied to the image pickup unit 401, image processing unit 402, and IEEE1394 interface 120. Thus, the image pickup process of each image pickup apparatus 110 (except for the master camera) is synchronized with the image pickup process of the master camera.

Step S509: The image pickup unit 401 of each image pickup apparatus 110 (except for the master camera) photographs the optical image of the object in response to the frame synchronization signal 603 and generates the image data corresponding to the optical image of the object. The image processing unit 402 converts the image data generated by the image pickup unit 401 into the image data of a predetermined data format. The IEEE1394 interface 120 transmits the image data generated by the image processing unit 402 to the control device 100 by using the Isochronous transfer system specified by the IEEE1394-1995 standard. The IEEE1394 interface 120 isochronously transfers the image data by using the data 301 (the channel number and bandwidth required for transmission of the image data) of the setting command. The control device 100 receives the image data isochronously transferred from each image pickup apparatus 110 (except for the master camera) and displays the image data onto the display device 105.

As described above, according to the image pickup system of the embodiment, the image pickup processes of a plurality of image pickup apparatuses can be easily synchronized by using the communication medium which conforms with the IEEE1394-1995 standard or its extended standard.

The invention may be embodied in other specific forms without departing from essential characteristics thereof. Therefore, the above-described embodiments are merely exemplary of this invention, and are not be construed to limit the scope of the present invention.

For example, although the embodiment has been described with respect to the example of using the communication medium which conforms with the IEEE1394-1995 standard or its extended standard, the invention is not limited to it. A communication medium which conforms with a standard other than the IEEE1394-1995 standard can be also used so long as it is a communication medium having a function for managing a predetermined communication cycle.

The functions of the embodiment mentioned above can be also accomplished by a method whereby, for example, a recording medium on which program codes of software to realize the functions of the embodiment mentioned above have been recorded is supplied to a system or an apparatus, and a computer (a CPU or an MPU) of the system or apparatus reads out the program codes stored on the recording medium and executes processes according to the program codes.

In this case, the program codes themselves read out from the recording medium realize the functions of the embodiment mentioned above. The recording medium on which the program codes have been recorded constructs the invention. As a recording medium, it is possible to use a magnetic disk, an optical disk, a magnetooptic disk, a CD-ROM, a magnetic tape, a non-volatile memory card, an ROM, or the like.

The invention incorporates not only a case where a computer executes the read-out program codes, so that the functions of the embodiment mentioned above can be realized but also a case where an OS or the like which is operating on the computer executes a part or all of actual processes on the basis of instructions of the program codes, and the functions of the embodiment mentioned above are realized by those processes.

Further, the invention incorporates a case where the program codes read out from the recording medium are written into a memory provided for a function expanding board inserted into a computer or a function expanding unit connected to a computer and, thereafter, a CPU or the like provided for the function expanding board or function expanding unit executes a part or all of actual processes in accordance with instructions of the program codes, and the functions of the embodiment mentioned above are realized by those processes.

In case of applying the invention to the recording medium, the program codes corresponding to the above-described processes are stored into the recording medium. However, explaining in brief, modules which are indispensable to the invention are stored into the recording medium.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. An image pickup apparatus comprising:
    a control unit adapted to determine whether said image pickup apparatus is set as a master camera;
    a communication unit adapted to (a) transmit a time stamp to another image pickup apparatus if it is determined by said control unit that said image pickup apparatus is set as the master camera, and (b) receive the time stamp generated in another image pickup apparatus set as the master camera if it is determined by said control unit that said image pickup apparatus is not set as the master camera, wherein the time stamp is used to synchronize frame synchronization signals generated in said image pickup apparatus and another image pickup apparatus;
    a time stamp generating unit adapted to generate the time stamp using time information provided by said communication unit if it is determined by said control unit that said image pickup apparatus is set as the master camera, wherein the time information is used to manage a communication cycle of said communication unit;
    a frame synchronization signal generating unit adapted to (a) generate a frame sychronization signal using the time stamp generated by said time stamp generating unit and time information if it is determined by said control unit that said image pickup apparatus is set as the master camera, and (b) generate frame sychronization signal using the time stamp received by said communication unit and the time information if it is determined by said control unit that said image pickup apparatus is not set as the master camera; and
    an image data generating unit adapted to generate image data using the frame sychronization signal generated by said frame sychronization signal generating unit.

2. An apparatus according to claim 1, wherein said communication unit is adapted to transmit the time stamp to another image pickup apparatus by an isochronous transfer if it is determined by said control unit that said image pickup apparatus is set as the master camera.

3. An apparatus according to claim 1, wherein the communication unit conforms to IEEE 1394-1995 standard or its extended standard.

4. A method of controlling an image pickup apparatus, comprising the steps of:
    determining whether the image pickup apparatus is set as a master camera;
    transmitting, using a communication unit, a time stamp to another image pickup apparatus if it is determined in the determining step that the image pickup apparatus is set as the master camera, wherein the time stamp is used to synchronize frame synchronization signals generated in the image pickup apparatus and another image pickup apparatus;
    receiving, using the communication unit, the time stamp generated in another image pickup apparatus set as the master camera if it is determined in the determining step that the image pickup apparatus is not set as the master camera;
    generating the time stamp using time information provided by the communication unit if it is determined in the determining step that the image pickup apparatus is set as the master camera, wherein the time information is used to manage a communication cycle of the communication unit;
    generating a frame synchronization signal using the time stamp generated in the time stamp generating step and time information if it is determined in the determining step that the image pickup apparatus is set as the master camera;
    generating a frame synchronization signal using the time stamp received in the receiving step and the time information if it is determined in the determining step that the image pickup apparatus is not set as the master camera; and
    generating image data using the generated frame synchronization signal.

5. A method according to claim 4, wherein the time stamp is transmitted to another image pickup apparatus by an isochronous transfer if it is determined in the determining step that the image pickup apparatus is set as the master camera.

6. A method according to claim 4, wherein the communication unit conforms to IEEE 1394-1995 standard or its extended standard.

7. An apparatus according to claim 1, wherein said control unit sets itself as the master camera in accordance with a command sent from an external control apparatus.

8. An apparatus according to claim 1, wherein the time information is used to manage a communication cycle conformed to IEEE 1394-1995 standard.

9. A method according to claim 4, further comprising a step of setting the image pickup apparatus as the master camera in accordance with a command sent from an external control apparatus.

10. A method according to claim 4, wherein the time information is used to manage a communication cycle conformed to IEEE 1394-1995 standard.

* * * * *

UNITED STATES PATENT AND TRADEMARK OFFICE
CERTIFICATE OF CORRECTION

PATENT NO. : 7,199,820 B2 Page 1 of 1
APPLICATION NO. : 10/073460
DATED : April 3, 2007
INVENTOR(S) : Hiroto Oka, Shinichi Hatae and Shinichi Koyama It is certified that error appears in the above-identified patent and that said Letters Patent is hereby corrected as shown below:

Column 4, line 29, delete " value a " and insert -- value $\alpha$ --

Column 5, line 44, delete " value a " and insert -- value $\alpha$ --

Signed and Sealed this

Sixteenth Day of October, 2007

JON W. DUDAS
*Director of the United States Patent and Trademark Office*